United States Patent Office 3,131,197
Patented Apr. 28, 1964

3,131,197
5-(3,4-CARBONYLDIOXYPHENYL)-3-ISOPROPYL-2-OXAZOLIDONE
Joseph V. Swintosky, Perkiomenville, Pa., assignor to Smith Kline & French Laboratories, Philadelphia, Pa., a corporation of Pennsylvania
No Drawing. Filed Mar. 13, 1963, Ser. No. 264,786
1 Claim. (Cl. 260—307)

This invention relates to a novel substituted oxazolidone derivative having valuable therapeutic activity. More specifically this invention relates to 5-(3,4-carbonyldioxyphenyl)-3-isopropyl-2-oxazolidone having the following structural formula:

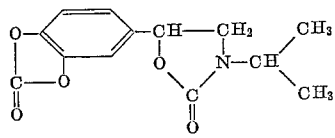

The novel compound of this invention has utility as a bronchodilator. More specifically, it is useful for the treatment of asthma. This compound is particularly advantageous for the treatment of asthma because it can be administered orally with the side effects of the prior art compounds, such as nausea, severe tachycardia, headache or weakness being markedly diminished. These side effects are so severe when the present antiasthmatic agents are given orally in therapeutic doses that such treatment is not recommended. The novel oxazolidone of this invention is therefore an orally effective antiasthmatic agent showing minimal side effects.

The novel oxazolidone of this invention is prepared according to the following synthetic procedure which is carried out using readily available starting materials giving excellent yieldes of the end product.

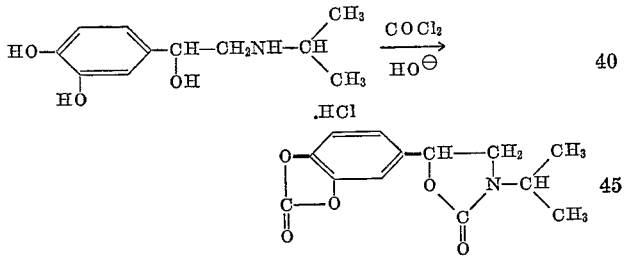

By way of example the preparation of the 5-(3,4-carbonyldioxyphenyl)-3-isopropyl-2-oxazolidone is carried out as follows.

To a stirred solution of 10.6 g. of 1-(3,4-dihydroxyphenyl)-2-isopropylaminoethanol hydrochloride in 100 ml. of deaerated water under a nitrogen atmosphere is added 11.0 g. of sodium hydroxide with cooling. A solution containing 25 ml. of phosgene in 75 ml. of toluene is slowly added to the isoproterenol solution over a period of 70 minutes and the mixture is stirred and cooled for an additional 75 minutes. The solution is then warmed and the excess phosgene is removed in vacuo. The aqueous layer is extracted with toluene and the toluene solutions are combined and washed with water. The solvent is removed in vacuo and the residue is recrystallized from benzene-hexane to yield a white solid having a melting point of 106–107° C.

The oxazolidone derivative of this invention is preferably employed in combination with either a liquid or solid nontoxic pharmaceutical carrier. A wide variety of pharmaceutical forms useful for oral ingestion may be employed. Advantageously the preparation may take the form of tablets, capsules, powders, troches or lozenges. When a solid form is employed the pharmaceutical carrier may be, for example, lactose, magnesium stearate, starch, gums such as acacia, terra alba, stearic acid, sorbitol, mannitol, ethyl cellulose or gelatin. The amount of solid carrier will vary widely but preferably is from about 25 mg. to about 1 gm. If a liquid carrier is used the preparation can be in the form of a soft gelatin capsule, placed in an ampule or in a liquid suspension.

The pharmaceutical forms comprising 5-(3,4-carbonyldioxyphenyl)-3-isopropyl-2-oxazolidone are administered in dosage units internally, preferably orally. Advantageously equal daily doses are administered to provide a daily dosage regimen which produces anti-asthmatic activity.

What is claimed is:
A chemical compound of the formula:

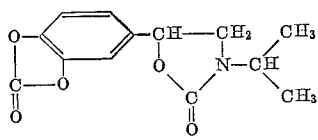

No references cited.